United States Patent [19]
Voight et al.

[11] 3,970,467
[45] July 20, 1976

[54] METHOD FOR MAKING CORRUGATING ADHESIVES WITH FLEXOGRAPHIC PRESS WASTE WATER

[75] Inventors: John E. Voight, Fenton; Edward M. Bovier, Dellwood; Clarence J. Liebman, St. Louis County, all of Mo.

[73] Assignee: Anheuser-Busch, Incorporated, St. Louis, Mo.

[22] Filed: Nov. 4, 1974

[21] Appl. No.: 520,243

Related U.S. Application Data

[63] Continuation of Ser. No. 358,540, May 9, 1973, abandoned.

[52] U.S. Cl. .................................... 106/213; 210/38
[51] Int. Cl.² ....................... C08L 3/00; C02B 1/40
[58] Field of Search ............................ 106/213, 210

[56] References Cited
UNITED STATES PATENTS

| | | |
|---|---|---|
| 3,155,527 | 11/1964 | Mentzer ............................ 106/213 |
| 3,228,781 | 1/1966 | Halpert .............................. 106/213 |

Primary Examiner—Lorenzo B. Hayes
Attorney, Agent, or Firm—Gravely, Lieder & Woodruff

[57] ABSTRACT

This application describes a method of preparing starch-based corrugating adhesives which involves treating the wash water in flexographic printing processes to remove ammonium ions and subsequently reusing the water in preparing the adhesives. The preferred process includes the steps of separating the ink solids from the wash water, recovering a liquor, and removing ammonium ions from the liquor to condition the liquor for subsequent use in preparing corrugating adhesives.

5 Claims, 1 Drawing Figure

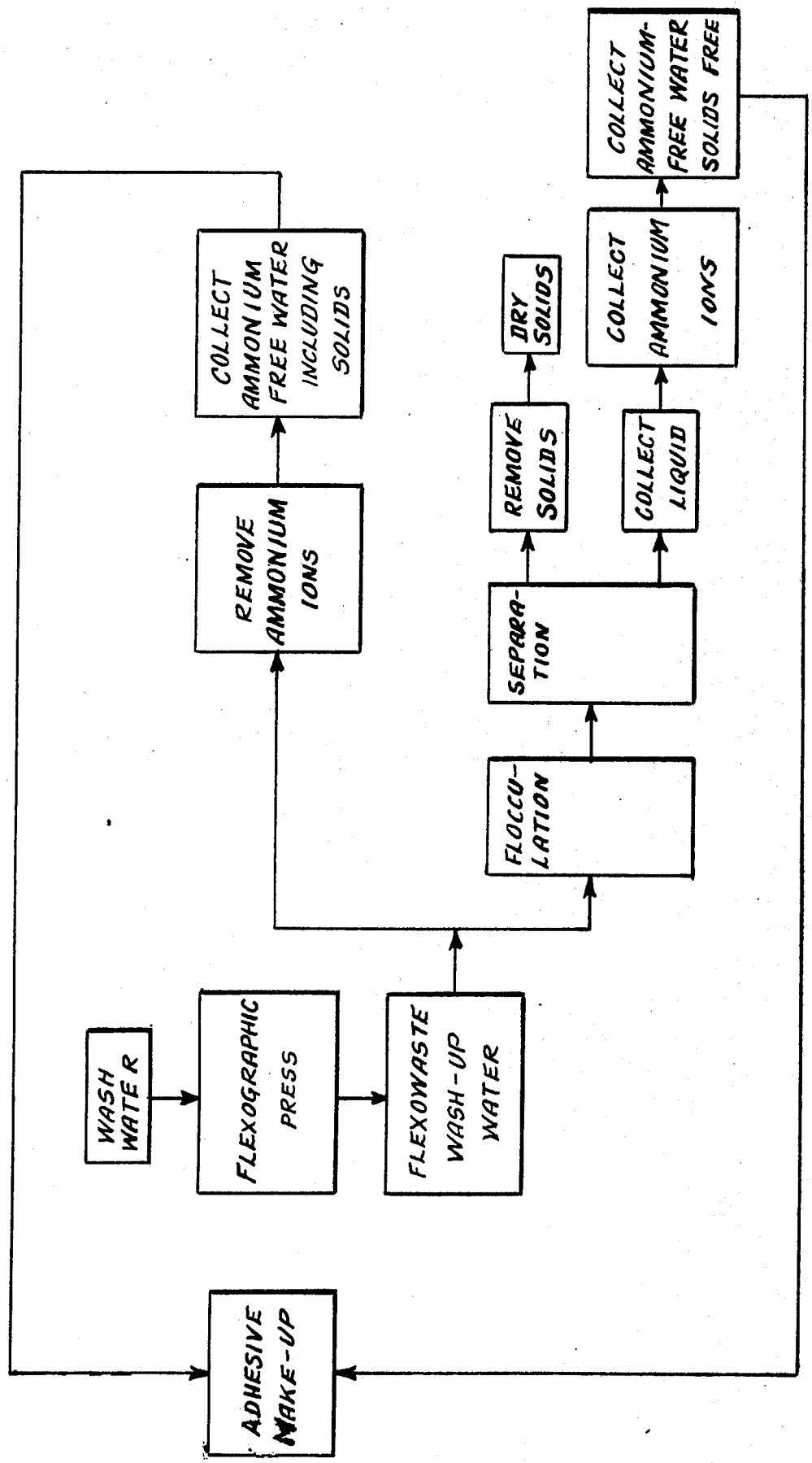

METHOD FOR MAKING CORRUGATING ADHESIVES WITH FLEXOGRAPHIC PRESS WASTE WATER

This is a continuation of application Ser. No. 358,540, filed May 9, 1973, now abandoned.

BACKGROND OF THE INVENTION

Flexographic printing processes are used extensively in the corrugated paperboard industry and such use is increasing. Accompanying the extensive use of the flexographic printing process is a problem in the disposal of the waste wash-up water from cleaning the presses. The presses periodically are cleaned by flushing with large quantities of water. The used wash water contains highly visible contaminants and presents a very difficult disposal situation in many areas. The optimum solution to the problem is the reuse of the water somewhere in the plant, preferably in preparing the adhesive to be used in the corrugating process. The reuse of the wash water should not detrimentally affect the use of the adhesive on the corrugating machinery, and the wash water should not affect the pH, viscosity or gel temperature of the adhesive.

SUMMARY OF THE INVENTION

The present invention comprises a method of separating the greater portion of the solids from the wash water of flexographic printing processes to make a clarified liquor suitable for certain reuse applications, such as in the preparation of corrugating adhesives. It further comprises a process of making said clarified liquor by flocculation of the ink solids, separation of the solids from the wash water, recovering the clarified liquor and removing ammonium ions therefrom. This is a simple and economical method of at least partially solving a disposal problem with the waste water and is an assistance in abating pollution.

DETAILED DESCRIPTION

The product obtained from flushing flexographic presses with water to remove unused or unwanted ink is known as flexo waste wash-up water. This water contains quantities of ink, is generally extremely dark, is usually of high tinctorial strength, and presents a difficult disposal problem in many areas. As average sample of wash water has a pH of about 8.5 and a composition similar to that shown in the following Table I.

TABLE I

|  | % By Weight |
|---|---|
| Organic Solids | 1.2 |
| Inorganic Solids | 1.8 |
| Water | 97.0 |

Usually some extraneous materials are present, mostly paper fibers, but this accounts for only a small percentage of the total solids weight. The solid material is composed mainly of finely divided particles, most of which are less than a few microns in diameter. The pH, because of the high ink dilution, usually approaches that of the water used for wash-up.

Several basic formulations are used by the industry to prepare corrugating adhesives. A two-tank formulation, with the cooked carrier and raw secondary portions both being of unmodified corn starch, is the most widely used. However, the flexo waste wash-up water treated by this invention can be used in any of the corrugating adhesive formulations used by the industry. A typical two-tank formulation results in an adhesive of 22% solids, a brass cup (B.C.) viscosity of between 30 and 40 seconds and a gel temperature of about 149°F.

A typical formulation and the processing of the same is as follows:

CORRUGATING ADHESIVE FORMULATION

A. Carrier Portion — Contains Cooked Starch — (Also called Primary)

1. Fill mixer with 125 gallons of water at 110°F.
2. Add 185 pounds of unmodified corn starch; mix for 3 minutes.
3. Add 4 pounds of borax pentahydrate.
4. Add 64 pounds of a 50% by weight solution of sodium hydroxide.
5. Heat to 160°F.; mix at 160°F. for 20 minutes.
6. Add 100 gallons cold water; mix well.

B. Raw Portion - Contains Raw Starch (Also called Secondary)

1. Fill another mixer with 310 gallons of water at 90°F.
2. Add 20 pounds of borax pentahydrate.
3. Add 1115 pounds of unmodified corn starch.

C. Final Mix

1. Slowly add carrier portion to raw portion, taking approximately 30 minutes to do so.
2. Mix well.

It has been found that using untreated flexo wash water as a replacement for the tap water in the primary portion of the adhesive formulation brings about aggregates of coalesced starch and results in unworkable adhesives.

When untreated flexo wash water is used in the secondary portion of the adhesive formulation, better results are obtained in that the starch does not coagulate. However, these results still are not completely satisfactory. In all subsequent work, the flexo wash water was substituted in the secondary portion of the adhesive.

The properties of the adhesives, in which untreated flexo wash water was used in the secondary, varied consistently from those of the control, in that the samples all had decreased pH and increased viscosities and gel points. These differences were further accentuated upon holding and were proportional to the amount of flexo wash water present. This is shown in the following Table II.

TABLE II

Effect of Untreated Flexo Wash Water on Adhesive Properties

| | Flexo Wash Water Content in Secondary | | | | | | | | | | | |
|---|---|---|---|---|---|---|---|---|---|---|---|---|
| | None | | | ⅓ | | | ⅔ | | | All | | |
| Time hrs. | 1 | 3 | 5 | 1 | 3 | 5 | 1 | 3 | 5 | 1 | 3 | 5 |
| pH | 11.8 | 11.8 | 11.8 | 11.7 | 11.6 | 11.6 | 11.5 | 11.4 | 11.4 | 11.4 | 11.2 | 11.2 |
| Visc. Sec. (B.C.) | 38 | 42 | 50 | 55 | 57 | 90 | 90 | 150 | 180+ | 115 | 180+ | 180+ |

TABLE II-continued

| | Effect of Untreated Flexo Wash Water on Adhesive Properties | | | | | | | | | | |
|---|---|---|---|---|---|---|---|---|---|---|---|
| | | | | | Flexo Wash Water Content in Secondary | | | | | | |
| | None | | | ⅓ | | | ⅔ | | | All | |
| Gel Pt. °F. | 149 | 149 | 149 | 150 | 151 | 151 | 151 | 152 | 152 | 152 | 154 | 154 |

We have found that the primary cause of paste instability of adhesives prepared with the waste water of flexographic process is the gradual evolution of ammonia from those adhesives.

The present invention comprises a method of separating the greater portion of solids from the wash water of a flexographic process to produce a clarified liquor suitable for reuse after the subsequent removal of the ammonium ions. Our invention involves the steps of collecting the waste water from a flexographic wash process; flocculating the solids; separating the solids and the clarified liquid; and treating the liquid to remove ammonia therefrom. The solids can be dried and disposed of.

It has also been found that satisfactory adhesives can be made using flexo water from which only the ammonium ions are removed without removing the ink solids. In certain adhesive applications where color and the incorporation of waste material can be tolerated in the end products, this alternate process could be used. However, the preferred process includes removing the ink solids.

These processes are shown schematically in the accompanying drawing which is a block diagram flow sheet of our process.

In the preferred process the ink solids are flocculated prior to their removal. Some of the materials which could be used as flocculating aids are alum, mineral acid, calcium chloride, cationic starch, synthetic polyelectrolytes, both anionic and cationic, and ferric sulfate.

Once the waste water has been treated with the flocculant, solids separation can be effected by decantation of the supernate after the solids have settled, vacuum filtration, or centrifugation.

The agent used for flocculation greatly influences the nature of the flocculated solids. For instance with alum, a voluminous floc which occupies about 60% of the starting volume remains upon settling. Mineral acid treatment (HCl to a pH of 4) gives a floc which occupies only about 35% of the starting volume. These differences in floc characteristics also are noticeable during filtration, where the alum-adjusted material filters more poorly than the acid-treated material.

None of the high molecular weight polyelectrolytes offer any flocculating advantages over the acid treatment. Preferably, a combination of treatments, such as pH adjustment or alum addition plus the addition of synthetic flocculants should be used to give an overall improvement in settling rate, floc volume and filtration rates. Many types of treatments are possible, depending on the starting wash water and the extent of treatment desired.

After flocculation, the solids are separated by filtration, centrifugation, evaporation, etc. The preferred method is filtration and the solids can be collected, dried, and then disposed of. The evaporation of the water from the solids can be accomplished by any conventional conduction, radiation, or convection methods.

At this stage the separated liquid presents substantially the same problems, if used in the secondary portion of the starch formulations, as does the use of the untreated wash water. The properties of the adhesives which contain the liquid separated from the solids vary consistently from the controls, in that the samples have increased in viscosity and gel temperature, and decreased in pH. For example, when the level of separated liquid is ⅓ the total volume of the water content of the secondary portion of an adhesive formulation, after five hours the viscosity of the adhesive has increased from 34 seconds to 148 seconds, the gel temperature has increased from 149°F. to 151°F., and the pH has dropped to 11.6 from 11.8. This trend is held regardless of the means of treatments used for solids removal.

This is shown clearly in the following Table, Table III.

TABLE III

| | Effect of Acid Flocculated (Solids Removed) Flexo Wash Water on Adhesive Properties | | | | | | | | | | | |
|---|---|---|---|---|---|---|---|---|---|---|---|---|
| | | | | | | Flexo Wash Water Content in Secondary | | | | | | |
| | None | | | ⅓ | | | ⅔ | | | All | | |
| Time hrs. | 1 | 3 | 5 | 1 | 3 | 5 | 1 | 3 | 5 | 1 | 3 | 5 |
| pH | 11.8 | 11.8 | 11.8 | 11.8 | 11.7 | 11.6 | 11.7 | 11.5 | 11.4 | 11.6 | 11.5 | 11.4 |
| Visc. Sec. (B.C.) | 30 | 38 | 45 | 34 | 60 | 148 | 36 | 68 | 180+ | 44 | 100 | 180+ |
| Gel Pt. °F. | 149 | 149 | 149 | 149 | 150 | 151 | 151 | 152 | 152 | 152 | 153 | 153 |

These data demonstrate that it is not the solids in the flexographic wash water which deters its use in the starch-based corrugating adhesive.

We have determined that by removing ammonia from the flexographic wash water we produce a water which is usable in the starch-based corrugating adhesive.

This is demonstrated in Table V presented hereinafter.

We have found that ammonia is liberated by the high alkalinity of the starch adhesive system. This lowers the pH of the adhesive and increases the gel temperature. These changes contribute to an increase in viscosity in the starch paste. The ammonia is more easily released at high temperatures and corrugating adhesives are normally kept and circulated at high temperatures so the ammonia is easily liberated in the corrugating system.

A nitrogen analysis reveals the average flexographic wash water, after separation of solids, contains a concentration of about 400 ppm ammonium ion. Before solids separation, the flexographic wash water contains about 500 ppm ammonium ion.

The ammonia is removed from the wash water by heating to 100° to 220°F. for up to 24 hours at a pH of 8.5 to 12.0. At the higher temperatures, the ammonia can be flashed off practically instantaneously.

The ammonia also can be removed by ion exchange. The wash water is passed through an ion exchange column at a rate of 1 to 2 gallons per minute per cubic foot of resin with the column containing Duolite C-25D type resin, which is a strong-acid cation exchanger, manufactured by Diamond Shamrock Chemical Co.

The adhesives listed in the following table, Table IV, were prepared according to the adhesive formulation previously set forth on page 4 to substantiate the effects that ammonium ion has on the adhesive properties.

Water, having 250 ppm, 500 ppm, and 1000 ppm ammonium ion was prepared and substituted for all of the tap water conventionally used in the secondary portion of the adhesive. A control adhesive containing tap water in the secondary was also prepared for comparison purposes. As the amount of ammonium ion in the secondary of the adhesive increased, the pH decreased, the gel temperature increased, and the viscosity increased with time.

The finished ion-exchanged material had no trace of ammonium ion. An adhesive was prepared according to the corrugating adhesive formulation hereinbefore set forth in which all of the secondary water was replaced with this ion-exchanged water. This adhesive exhibited the same properties as a control prepared with tap water, i.e., in a 5 hour period the pH remained steady, the increase in viscosity was minimal, and the gel temperature remained the same (See Table V).

EXAMPLE 2

The remaining portion (850 cc) of the filtrate from Example 1 containing 410 ppm of ammonium ion before ion-exchanging was treated according to the following procedure. The pH was adjusted to 10.7 with a 50% solution of sodium hydroxide. This solution was then mixed at 130°F. for 8 hours. At the end of this time, the pH was 9.5 and it had been that value for the last several hours indicating that most of the ammonium ions had been vaporized off as ammonia. The ammonium ion concentration was found to be approximately 20 ppm. An adhesive was prepared according to the corrugating adhesive formulation hereinbefore set forth in which all of the secondary water was replaced with this alkali and heat-treated water. This adhesive exhibited the same properties as a control prepared

TABLE IV

Effect of Ammonium Ion Concentration on Adhesive Properties
Ammonium Ion Content in Secondary

| | None | | | 250 ppm | | | 500 ppm | | | 1000 ppm | | |
|---|---|---|---|---|---|---|---|---|---|---|---|---|
| Time hrs. | 1 | 3 | 5 | 1 | 3 | 5 | 1 | 3 | 5 | 1 | 3 | 5 |
| pH | 11.8 | 11.8 | 11.8 | 11.8 | 11.6 | 11.6 | 11.7 | 11.5 | 11.5 | 11.5 | 11.3 | 11.3 |
| Visc. Sec. (B.C.) | 38 | 38 | 45 | 32 | 70 | 97 | 39 | 80 | 180+ | 55 | 150 | 180+ |
| Gel. Pt. °F. | 149 | 149 | 149 | 149 | 151 | 152 | 150 | 153 | 155 | 152 | 155 | 156 |

The following examples illustrate methods of treating the wash water from flexographic printing processes and subsequent reuse of the water in preparing corrugating adhesives.

EXAMPLE 1

To 2000 cc of untreated flexo wash water containing 2.8% total solids and 480 ppm of ammonium ion was added 12.5 cc of an 18% solution of hydrochloric acid which lowered the pH from 8.5 to 4.0. The flocculated solids were vacuum-filtered from the liquid. Approximately 1850 cc of filtrate were collected containing 410 ppm of ammonium ion. 1000 cc of the filtrate was ion-exchanged using the following procedure.

A 250 cc glass burette was used for the column and the ion exchange resin used was the hydrogen form of Duolite C-25D. The column and resin were conditioned as set forth in the "Duolite Ion Exchange Manual", pages 33 and 34. The 1000 cc of filtrate were flowed through the column at a rate of 0.2 cc/minutes/cc of resin (or 1.5 gallons/minute/cu. ft. of resin). Total flow time was 50 minutes.

with tap water, i.e., in a 5 hour period the pH remained steady, the increase in viscosity was minimal, and the gel temperature remained the same (See Table V).

EXAMPLE 3

The pH of 500 cc of untreated flexo wash water containing 2.8% total solids and 480 ppm of ammonium ion was adjusted to 10.7 with a 50% solution of sodium hydroxide. This water was then mixed at 130°F. for 8 hours. The ammonium concentration at the end of this time was approximately 30 ppm. An adhesive was prepared according to the corrugating adhesive formulation hereinbefore set forth in which all of the secondary was replaced with this alkali and heat-treated water which still contained the ink solids. This adhesive exhibited nearly the same properties as the control prepared with tap water. One significant difference was that the adhesive containing the treated flexo water and ink solids was highly colored. In a 5-hour period the pH remained steady, the increase in viscosity was slightly more than that of the control, and the gel temperature remained the same (See Table V).

TABLE V

Data From Examples 1, 2, and 3

| | Control | | | Example 1 | | | Example 2 | | | Example 3 | | |
|---|---|---|---|---|---|---|---|---|---|---|---|---|
| Time hrs. | 1 | 3 | 5 | 1 | 3 | 5 | 1 | 3 | 5 | 1 | 3 | 5 |
| pH | 11.8 | 11.8 | 11.8 | 11.8 | 11.8 | 11.8 | 11.8 | 11.8 | 11.8 | 11.8 | 11.8 | 11.8 |
| Visc. Sec. (B.C.) | 36 | 40 | 45 | 39 | 39 | 47 | 35 | 42 | 47 | 45 | 50 | 57 |
| Gel Pt. °F. | 149 | 149 | 149 | 149 | 149 | 149 | 149 | 149 | 149 | 149 | 149 | 149 |

What is claimed is:

1. In a method for preparing starch-based corrugating adhesives comprising mixing a carrier portion containing an aqueous slurry of cooked starch with a secondary portion containing an aqueous slurry of raw starch, the improvement comprising, as the water in said secondary portion, flexographic press water prepared by the steps of
   A. washing a flexographic printing press with water,
   B. collecting the wash water, and
   C. removing ammonium ions from the wash water.

2. The process of claim 1 including the step of removing the solids from the flexographic press wash water prior to removing the ammonium ions therefrom.

3. The method of claim 1 wherein the ammonia is removed by treating the water at a pH of about 8.5 to about 12 for up to about 24 hours at a temperature of about 11°F. to about 220°F.

4. The method of claim 1 wherein the ammonia is removed by ion exchange.

5. The method of claim 4 wherein the wash water is passed through an ion exchange column at a rate of 1–2 gallons per minute per cubic foot of resin.

* * * * *